United States Patent
Carrick et al.

(10) Patent No.: US 6,364,255 B1
(45) Date of Patent: Apr. 2, 2002

(54) MODULAR CENTER SPINE CABLE WAY

(76) Inventors: Douglas Scott Carrick, 4875 NW. Kahneeta Dr., Portland, OR (US) 97229; Grant Wayne Carrick, 15832 NW. Cleary, Beaverton, OR (US) 97006

( * ) Notice: Subject to any disclaimer, the term of this patent is extended or adjusted under 35 U.S.C. 154(b) by 0 days.

(21) Appl. No.: 09/461,650

(22) Filed: Dec. 14, 1999

(51) Int. Cl.[7] .................................................. F16L 3/00
(52) U.S. Cl. ........................ 248/49; 248/65; 248/68.1
(58) Field of Search .............................. 248/49, 52, 65, 248/68.1, 75, 76, 80, 302; 174/68.1, 68.3, 72 A; F16L 3/00

(56) References Cited

U.S. PATENT DOCUMENTS

| | | | | |
|---|---|---|---|---|
| 3,042,351 A | * | 7/1962 | Du Bois | 248/49 |
| 3,136,515 A | * | 6/1964 | Potruch | 248/62 |
| 3,363,048 A | | 1/1968 | Vaughn | |
| 4,280,258 A | * | 7/1981 | Kunze | 24/257 |
| 5,123,618 A | | 6/1992 | Guterman et al. | |
| 5,531,410 A | * | 7/1996 | Simon | 248/49 |
| 5,704,571 A | * | 1/1998 | Vargo | 248/58 |
| 5,816,542 A | | 10/1998 | Rinderer | |
| 5,839,702 A | * | 11/1998 | Jette | 248/49 |
| 5,868,361 A | * | 2/1999 | Rinderer | 248/58 |
| 5,893,539 A | * | 4/1999 | Tran et al. | 248/68.1 |
| 5,921,402 A | * | 7/1999 | Magenheimer | 211/26 |
| 5,940,962 A | * | 8/1999 | Shima et al. | 29/825 |
| 5,957,416 A | * | 9/1999 | Sellati | 248/61 |
| 6,019,323 A | * | 2/2000 | Jette | 248/49 |
| 6,198,047 B1 | * | 3/2001 | Barr | 174/68.3 |

* cited by examiner

Primary Examiner—Anita King
Assistant Examiner—Naschica S Morrison
(74) Attorney, Agent, or Firm—Miller Nash LLP

(57) ABSTRACT

A modular cable way system, for securing and managing low voltage cables above a drop ceiling, having a central, typically cylindrical, spine with ribs attached typically perpendicular to the spine. The central spine is preferably bendable tubing to allow on site modification of the cable way system. A variety of rib shapes and configurations are provided so that cable way modules can be joined together having different rib configurations to provide a desirable configuration for cable management needs.

19 Claims, 8 Drawing Sheets

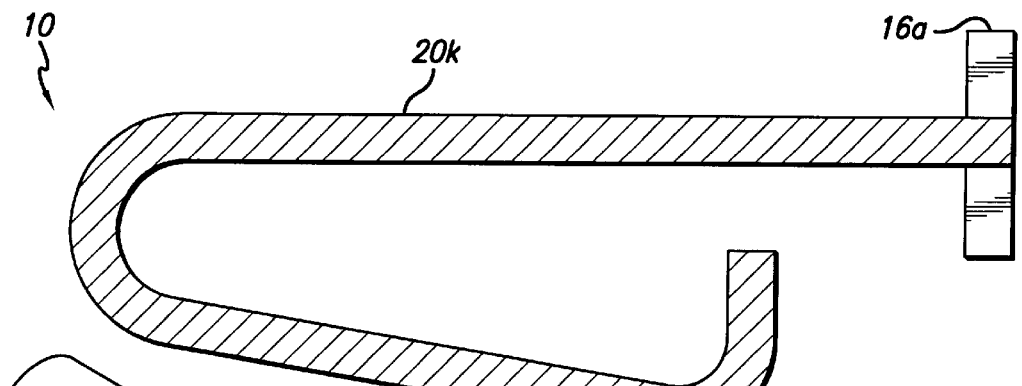
FIG. 15
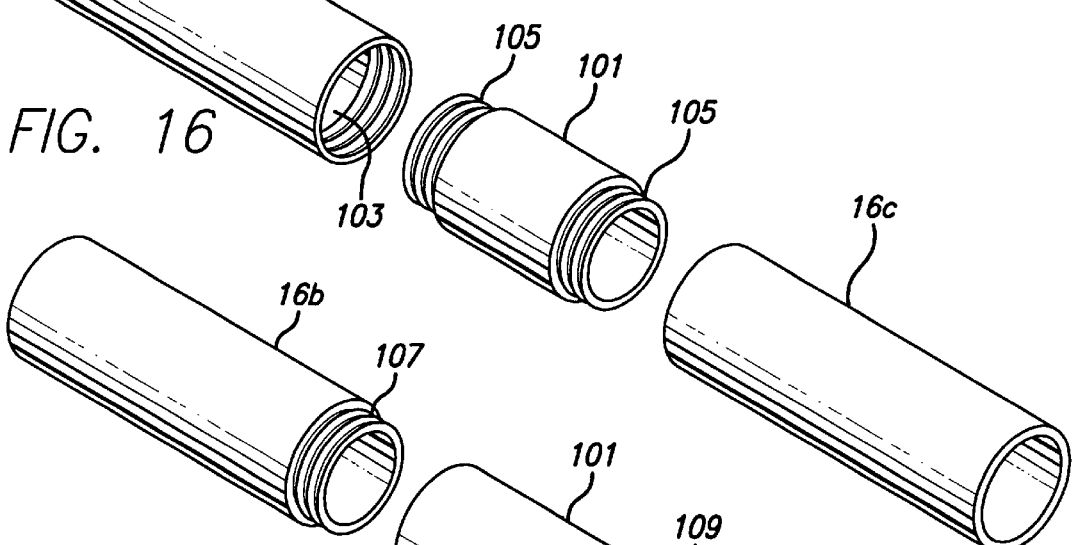
FIG. 16
FIG. 17
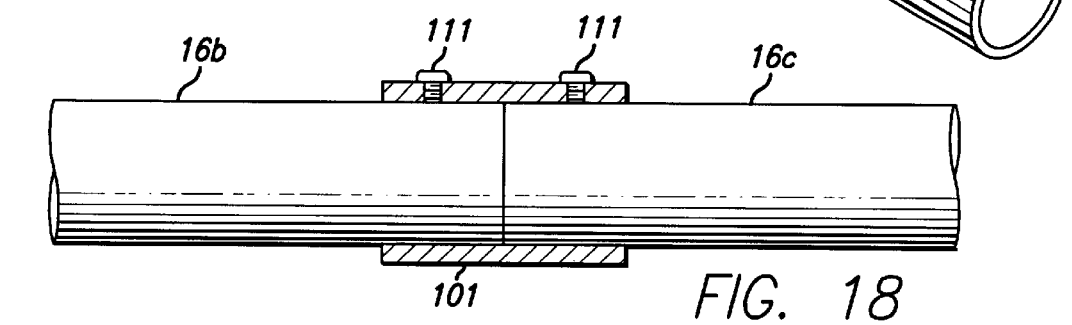
FIG. 18

MODULAR CENTER SPINE CABLE WAY

TECHNICAL FIELD

The present invention relates to a cable way system, and more particularly to a modular cable way system for low voltage cables and fiber optic cables, such as those used for telephone systems and computer networks, as well as, pneumatic tubes, and beverage hoses.

BACKGROUND OF THE INVENTION

The increase in the number of devices such as telephones, facsimile machines, and especially computer equipment in the work place has greatly increased the amount of low voltage cabling required to connect all of these devices. This increase has caused problems such that a need exists to provide a means to secure and manage a large amount of low voltage cable.

In most offices cabling is run in the space above dropped ceilings. When the amount of wiring was relatively small, the cabling could be simply laid across the dropped ceiling or tied to the ceiling support wires. As the amount of wiring laid on the dropped ceiling increased, national electrical codes were enacted requiring the wiring to be secured a required distance above the ceiling grid. For some applications it was possible to tie cable to ceiling support wires. However, tying high speed communications cable, such as category 5 cable, often resulted in the cable being bent into a tight bend radius. The resulting deformation in the cable causes degradation in the data transmission rate. Also, it is now generally against code to use the ceiling support wires as a means of cable support.

A number of cable ways have been designed to provide a means to secure and manage a large volume of low voltage cables. These cable ways are most commonly ladder-type cable ways or woven-type cable ways. A typical ladder-type cable way is formed by a pair of parallel supports with rungs attached across them, such that the cable way looks like a ladder that is laid flat. Woven-type cable ways are constructed of wire that has been woven or joined to form a basket like structure for supporting cables. Both types of cable ways are bulky and difficult to install in the tight spaces above a dropped ceiling. Further, both types of cable ways are difficult to route around obstacles in the space above a dropped ceiling such as heating and air conditioning ducts, plumbing, and power cables.

Some cable ways employ a central spine with ribs, sometimes referred to as "fingers" or "rungs," attached perpendicular to the central spine. For example, U.S. Pat. No. 3,363,048 ('048) to Vaughn discloses a cable way having a tubular central spine with fingers welded, or otherwise permanently attached, to the central spine. The fingers form a shallow upward facing U-shaped channel attached to the central spine. The shallow U-shaped channel of the Vaughn cable way does not provide sufficient security to retain cables. This is particularly true when the cable way is substantially full of cables. U.S. Pat. No. 5,123,618 to Guterman et al. discloses a cable way utilizing a rectangular spine with removable fingers. One problem with the removable fingers is that the time required to add or remove fingers can add a significant cost to the installation of the cable way.

A need exists for a low cost cable way that is easy to install in new and existing structures. Preferably, the cable way should be easily installed without the need for special training or tools. The cable way should be able to be routed around obstacles and still hold the necessary cabling in place. It is believed that the present invention provides these and other advantages.

BRIEF SUMMARY OF THE INVENTION

The invention is a modular cable way system for securing and managing cables typically in a dropped ceiling.

A preferred embodiment of the system includes a variety of cable way modules that can be used together to achieve a desired cable way layout. The cable way modules of the present invention typically have bendable spines with ribs attached substantially perpendicular to the spine. Several cable way modules, each having a different rib configuration, can be joined together to add to the versatility of the system. The ribs can form one or more upward facing troughs, closed loops, or substantially closed loops that have a relatively narrow opening to allow for insertion of existing cables without the need to restring cables.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

In the drawings, like reference numbers refer to like parts throughout the various views, suffix letters denote variations in key components between embodiments, and wherein:

FIG. 15 is a sectional view of an alternative preferred embodiment of a cable way module having a flat spine adapted for use with flat walls or under a desk.

FIG. 16 is an exploded view of two cable way modules and a coupler.

FIG. 17 is an exploded view of an alternative preferred embodiment of two cable way modules and a coupler.

FIG. 18 is a section view of an alternative preferred embodiment of a coupler securing two cable way modules.

DETAILED DESCRIPTION OF THE INVENTION

Figure 1:
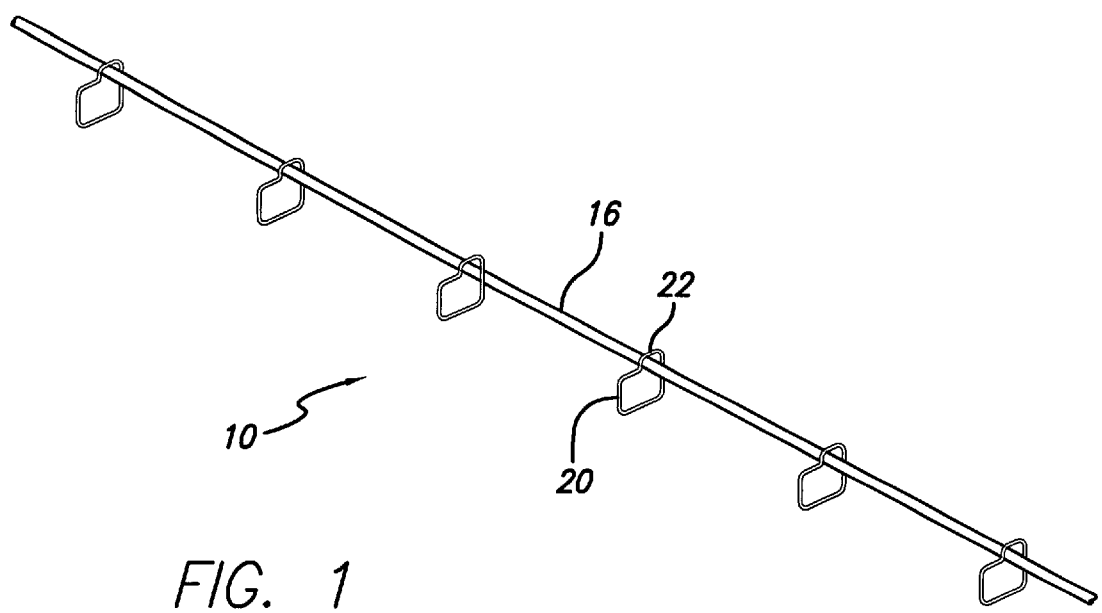
FIG. 1 is a pictorial view of an exemplary cable way system constructed in accordance with the present invention.

Referring now to FIG. 1, a cable way module 10 includes a spine 16 connected to a rib 20. Each rib 20 is preferably attached to the spine 16 by a resistance weld 22. The resistance weld 22 is preferably formed by placing each rib 20 in contact with the spine 16 and welding the rib in place. The rib 20 can be attached by other well known methods such as brazing. The rib 20 is preferably attached substantially perpendicular to the spine 16. Although it is generally preferable for the ribs to be attached perpendicular to the spine, it is possible to attach the ribs at various angles and still practice the present invention. The number and spacing of ribs along the spine will depend on the type and weight of the cable to be laid across the cable way.

Figure 2:
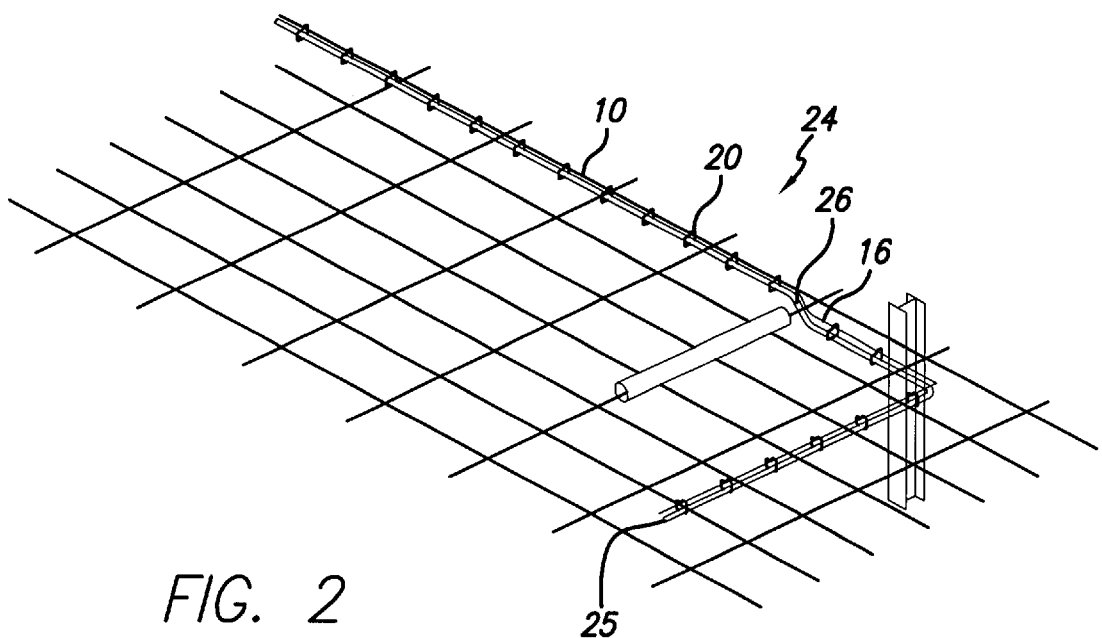
FIG. 2 is a pictorial view of an exemplary cable way system positioned above a ceiling grid.

As shown in FIG. 2, a cable way system 24 according to the present invention is preferably composed of sections of cable way module 10 connected together to support cables 25. Sections of cable way module can be joined using a variety of well known methods used to join sections of electrical metallic tubing ("EMT"). Each section of cable way module 10 would typically range between approximately two and twenty feet. Each section could then be easily placed into the space above the drop ceiling and secured using a variety of well known methods for securing EMT. The cable way module 10 can be installed and secured within the space above the drop ceiling by attaching the spine to a beam, bar joist, decking, or a drop wire using standard fittings designed to secure standard EMT. There are standard fittings available and known to those of ordinary skill in the art for mounting EMT to concrete, wood, metal studs, drop wires and other structures. No custom tools or parts are required for installation. Depending on the configuration of the rib 20, the cable way module 10 can be suspended from above, or mounted to a wall or other vertical surface. A section 26 of the cable way system 24 can be bent in place to avoid obstacles or change elevation where necessary. Because standard EMT is used for the spine 16, the bends can be readily formed using standard tools and techniques for bending EMT.

The modular construction of the system 24 allows the system to be adapted to provide versatile solutions to such problems as avoiding obstacles, changing elevation or routing cables between floors. Each section 26 can be selected with the rib 20 shaped to address a specific cabling need. For example, a circular closed loop configuration can be used when transitioning cabling between floors. A "G" configuration, on the other hand, is good for securing previously installed cable without the need to restring.

Figure 3:
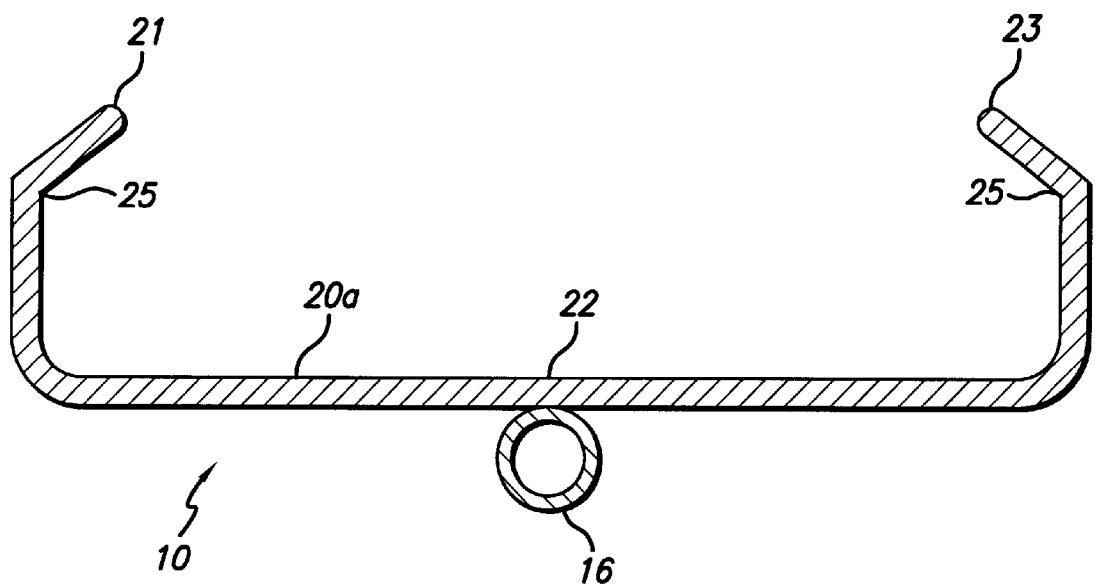
FIG. 3 is a sectional view of one section of a preferred embodiment of a cable way module with an open top configuration.

FIG. 3 shows an open top configuration cable way module. A rib 20a is formed into a substantially open, upward facing U-shape. The rib 20a has a first end 21 and a second end 23, both of which have a bent portion 25 that is bent inward toward the spine 16. The bent portions 25 are important to aid in securing a large number of cables and preventing them from falling out of the U-shaped channel. A plurality of ribs 20a are preferably spaced along the spine 16 to provide adequate support and to avoid excessive deformation of the cables. This is particularly important when the cable being used is category 5 cable or other deformation sensitive cabling or optical fiber. The rib 20a is ideal for applications where existing cabling, previously laid across the dropped ceiling or tied to support wires, needs to be placed into a cable way. The open design allows the cables to be placed in the cable way without the need to restring the cables through a closed loop.

Figure 4:
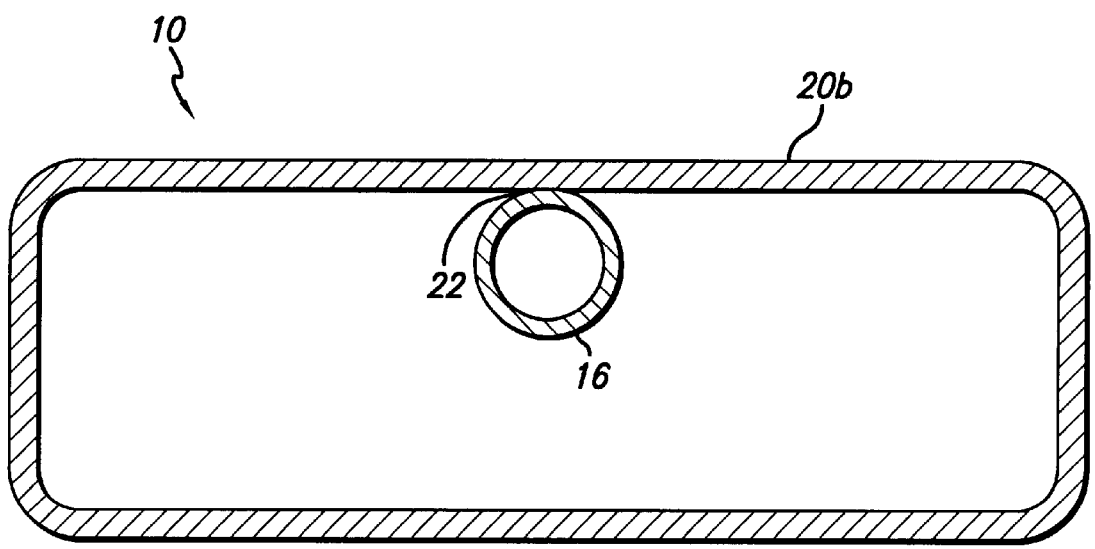
FIG. 4 is a sectional view of an alternative preferred embodiment of a cable way module with a rectangular closed loop configuration.

FIG. 4 shows a rectangular closed loop rib 20b attached to the tubular spine 16. In many situations, it is important to secure cabling to prevent it from inadvertently escaping the cable way. When security is important, a closed loop is preferable to the open configurations When security is important but the cables will be run horizontally, a rib 20b forming a substantially rectangular closed loop is ideal, because the width of the rectangle allows for a larger number of cables without piling as many on top of each other.

Figure 5:
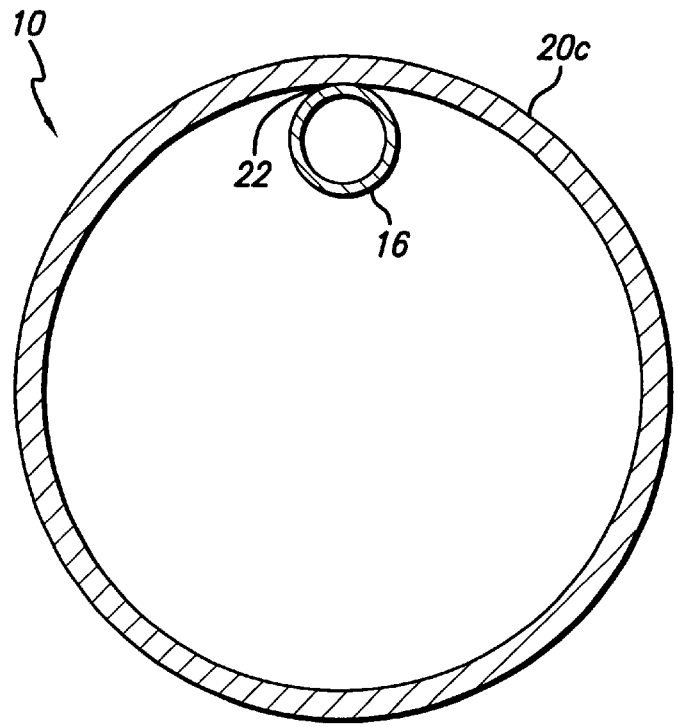
FIG. 5 is a sectional view of an alternative preferred embodiment of a cable way module with a circular closed loop configuration.

A circular closed loop configuration such as that shown in FIG. 5 is particularly suitable when directing cabling vertically between floors or to hub connections in telecommunications rooms or computer server rooms below ceiling level. In this embodiment a substantially circular closed rib 20c is attached to the spine 16.

Figure 6:
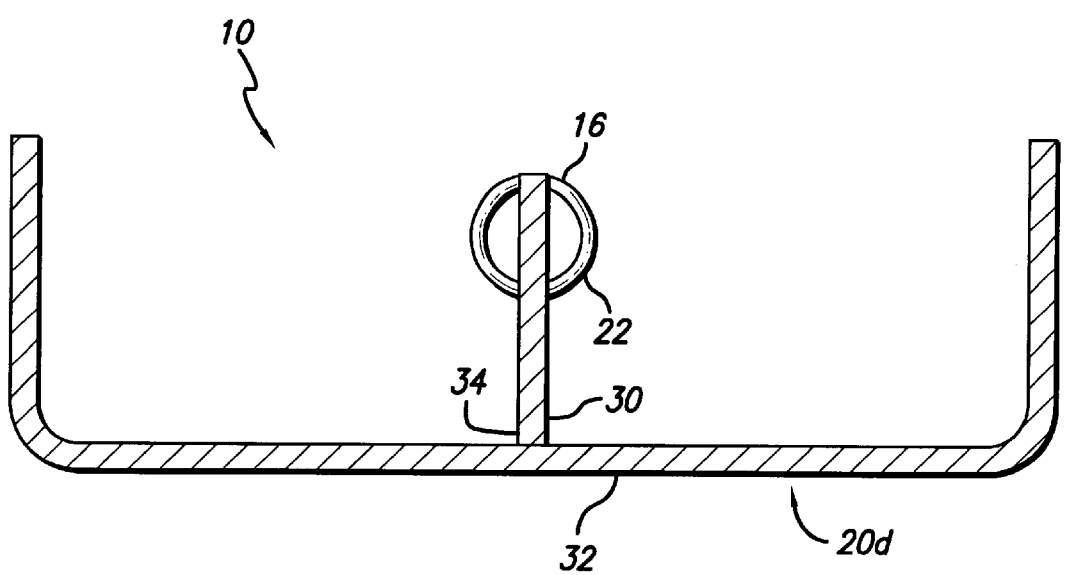
FIG. 6 is a sectional view of an alternative preferred embodiment of a cable way module with a "lazy E" configuration.

FIG. 6 shows a lazy "E" configuration in which a rib 20d forms a lazy "E". The lazy "E" configuration has a rib in the shape of an "E" lying on its side attached to the spine 16. The lazy "E" configuration is formed by welding a vertical rod 30 to the spine 16. A second cable support rod 32 is formed as an upward facing open topped rectangle and then welded to a lower end 34 of the rod 30. The rib 20d allows cabling which needs to be separated to be run along the same cable way 10. The lazy "E" configuration is ideal for situations in which it is desirable to run both telephone and data cables within the same section of cable way, while simultaneously keeping the sets of cables clearly separated for management purposes.

Figure 7:
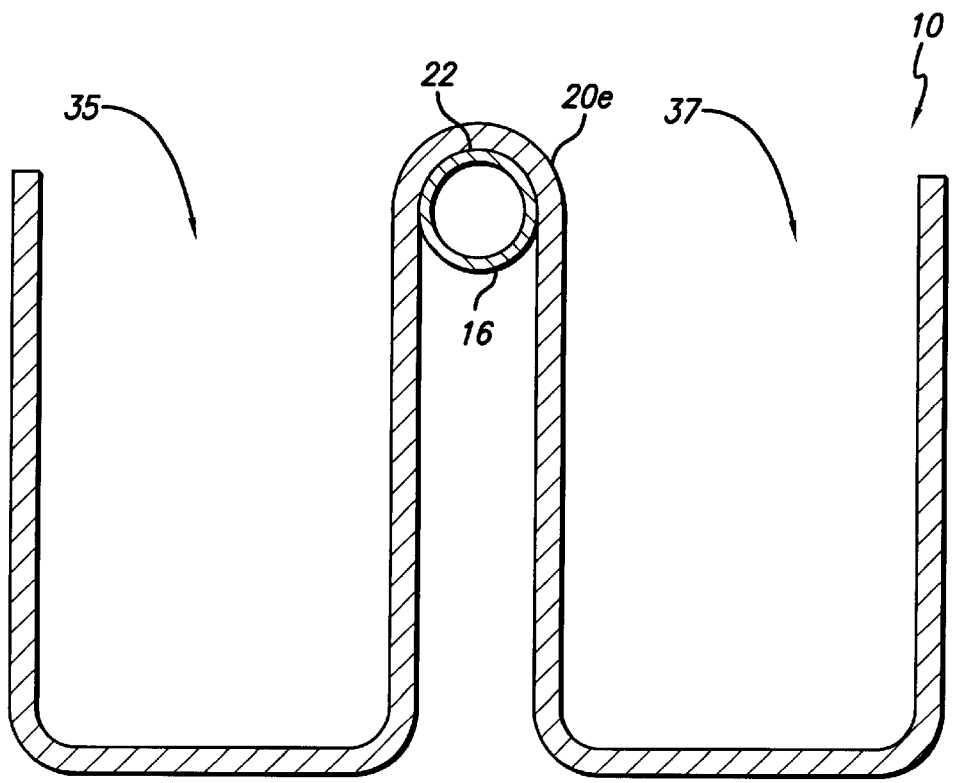
FIG. 7 is a sectional view of an alternative preferred embodiment of a cable way module with a double "U" configuration.

FIG. 7. shows an alternate double "U" configuration that functions similarly to the lazy "E" configuration of FIG. 6. The double "U" configuration is constructed by bending a single rib 20e across the spine 16 and connecting the spine to the rib at its central bend. The rib 20e forms deep troughs 35 and 37 to maintain the cables within the cable way module 10. This double "U" configuration provides the ability to separate cables in the same way as the lazy "E" configuration. By bending the rib 20e across the spine 16, however, the weight of the cabling is distributed across the spine rather than from a supporting weld or attachment from below. This provides additional strength and stability.

Figure 8:
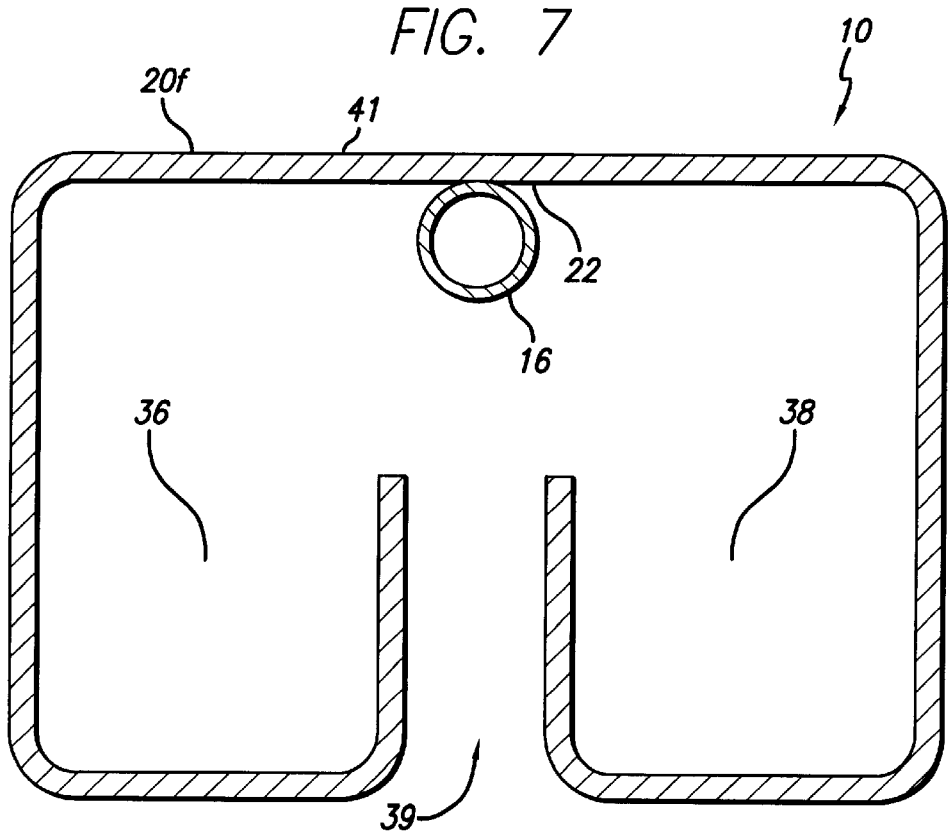
FIG. 8 is a sectional view of an alternative preferred embodiment of a cable way module with a reverse double "U" configuration.

FIG. 8 shows a rib 20f formed as a reverse double "U" having two channels 36 and 38. The reverse double "U" configuration is formed by attaching a central portion of the rib 20f to the spine 16 and bending both ends of the rib 20f downward, partially inward, and then partially upward to form the two channels 36 and 38. This configuration provides both cable separation and improved security to prevent cabling from inadvertently escaping the cable way 10. Cable can be strung through either of channels 36 and 38 or lifted up from beneath through the gap 39 and laid into the appropriate channel. The upper portion 41 of the rib 20f protects the cable from being disturbed and maintains the cables within the channels.

Figure 9:
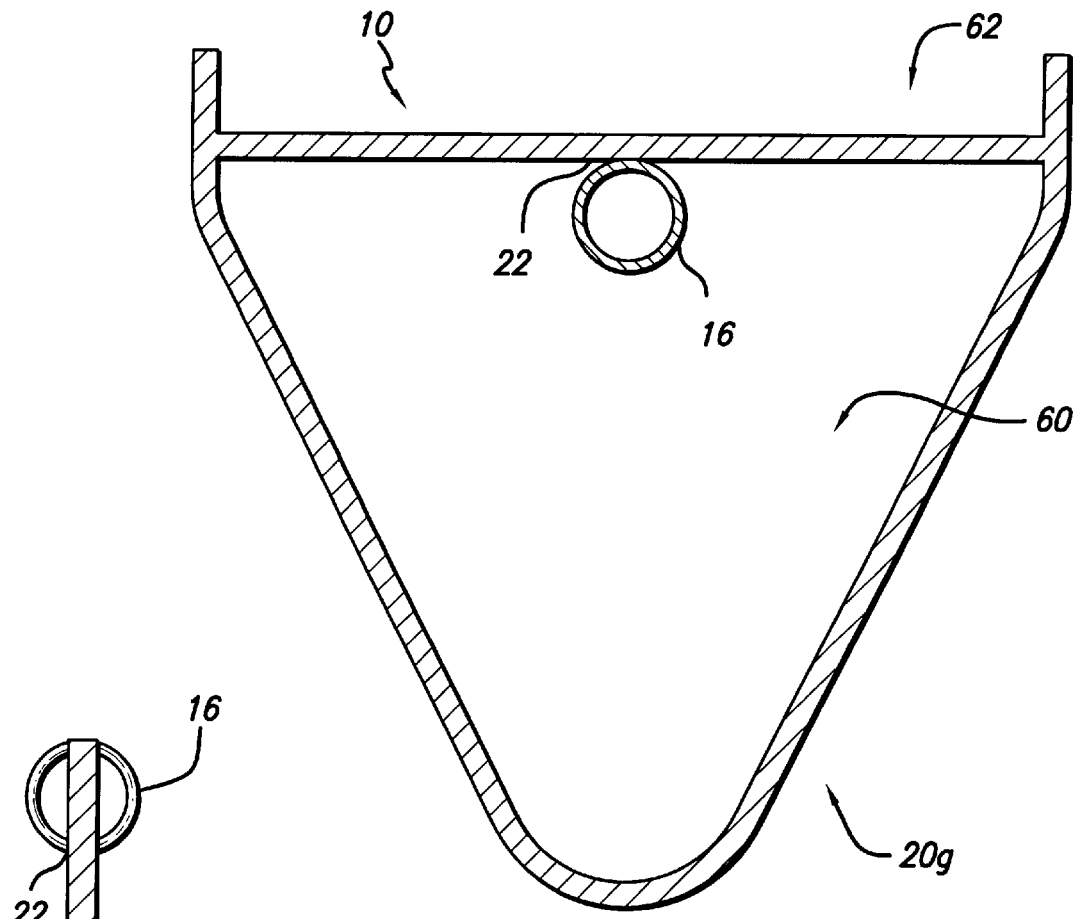
FIG. 9 a sectional view of an alternative preferred embodiment of a cable way module with a closed lower portion and an open upper portion.

A rib 20g is shown in FIG. 9 having a closed lower portion 60 for securing the first set of cables and an open upper portion 62 that allows easy cable replacement. This is useful for applications that require one set of cables to be secured, while a second set of cables can be added or removed periodically.

Figure 10:
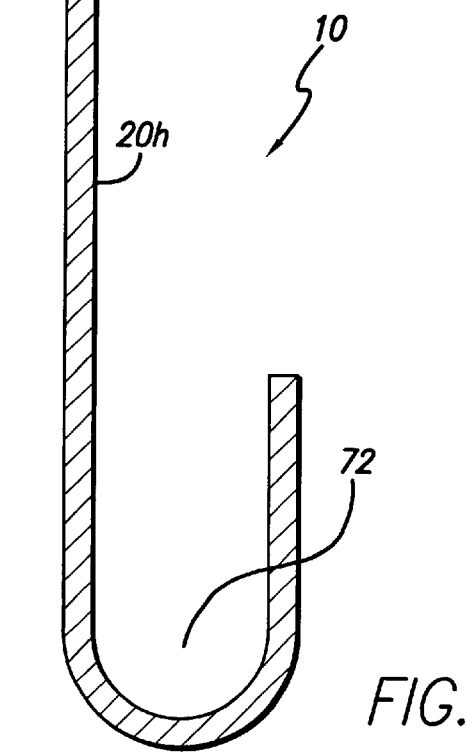
FIG. 10 is a sectional view of an alternative preferred embodiment of a cable way module with a "J" configuration.

FIG. 10 shows a rib 20h shaped in the form of a "J". This configuration is particularly suitable for mounting along a wall or other vertical structure. New or existing cabling can then be placed into a channel 72 formed by the ribs 20h.

Figure 11:
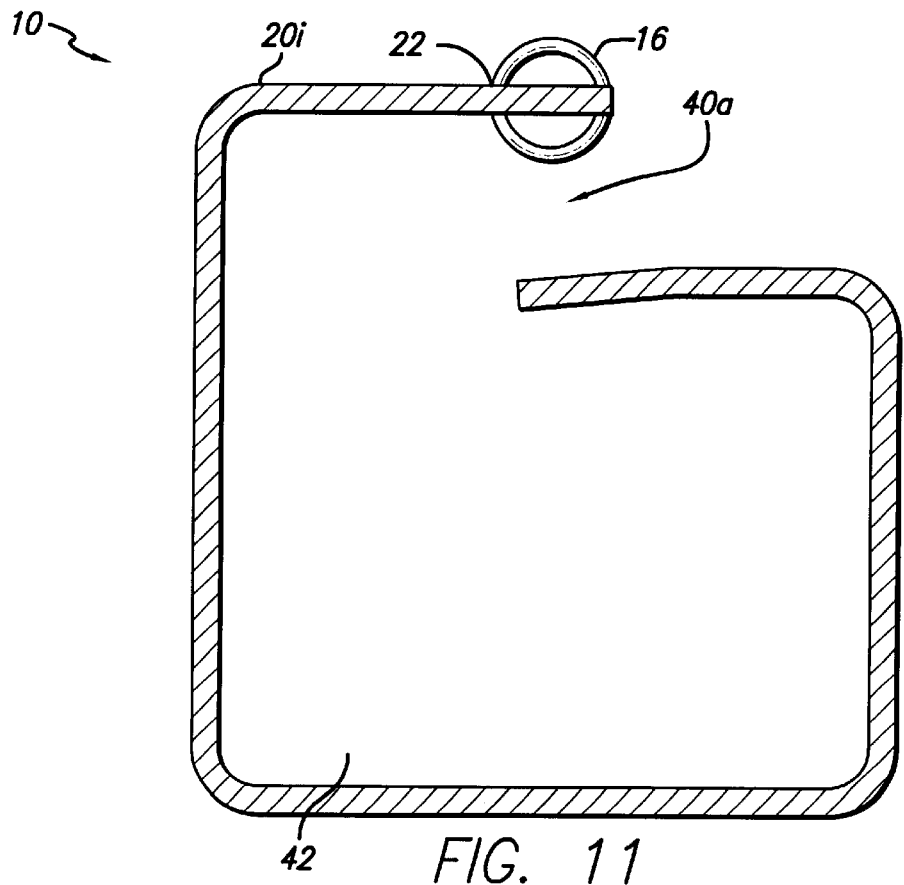
FIG. 11 is a sectional view of an alternative preferred embodiment of a cable way module with a "G" configuration.

Referring now to FIG. 11, a solution to the problem of securing existing cabling is to provide a substantially closed rib 20i, or "G" configuration. An opening 40a is formed so that existing cabling can be slid through the gap. The cabling then drops into an inner portion 42. The opening 40a is adapted such that it is sufficiently large to allow the insertion of cables, but small enough so that a bundle of cables will be unlikely to exit inadvertently once inserted. An optional overlapping portion of the "G" configuration helps secure the cables within the inner portion 42.

It is generally preferable to utilize standard EMT for the spine, because it can be easily bent and shaped to go around obstacles within the ceiling space. EMT is also desirable because there are a variety of readily available tools for bending and securing EMT. The spine 16 is preferably half inch or three-quarter inch standard EMT. Although reference has been made throughout this description to EMT, any bendable pipe or tubing could be used, whether made of metal, plastic or other material. It is even possible to practice this invention using a flat spine, instead of a tubular spine.

Figure 12:
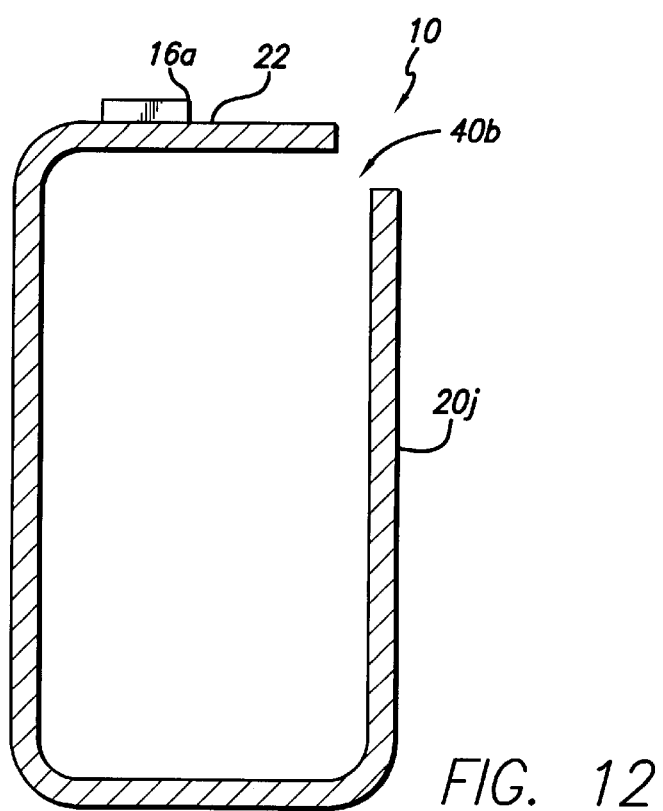
FIG. 12 is a sectional view of an alternative preferred embodiment of a cable way module having a flat spine with an open "D" ring configuration.
Figure 13:
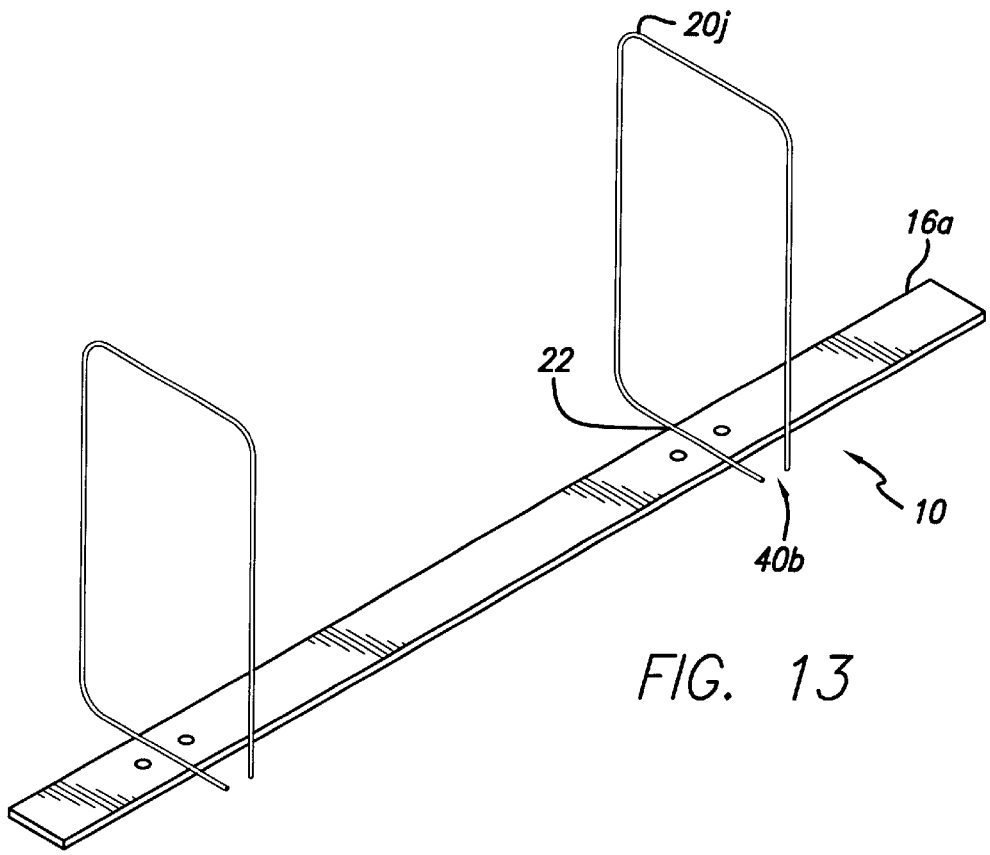
FIG. 13 is an isometric view of an alternative preferred embodiment of a cable way module having a flat spine with an open "D" ring configuration.
Figure 14:
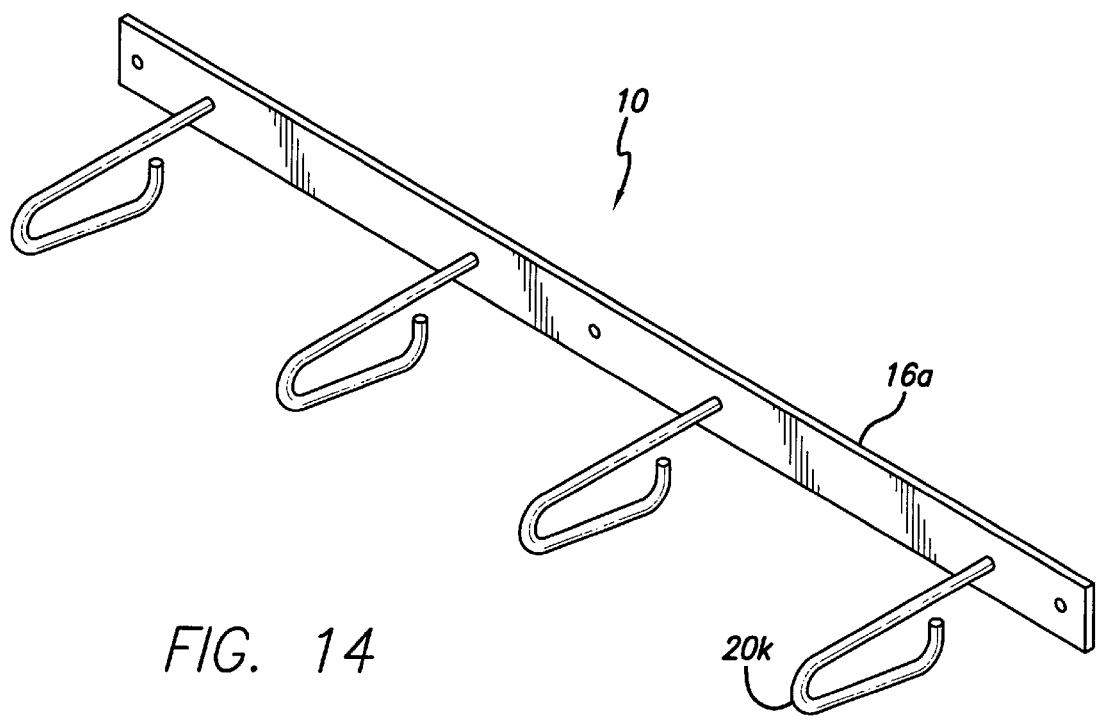
FIG. 14 is an isometric view of an alternative preferred embodiment of a cable way module having a flat spine adapted for use with flat walls or under a desk.

For some applications it is preferable to utilize a flat spine. A flat spine is ideal for mounting against flat walls or under desks. FIGS. 12 and 13 show a substantially closed rib 20j forming a rounded rectangular rib attached to a flat spine 16a with a small opening 40b to allow insertion of cabling. The flat spine 16a ideally includes predrilled holes to allow for easy mounting to a flat surface. A similar cable way module can also be used at a desk or work station to manage cabling. As shown in FIGS. 14 and 15, a rib 20k is attached substantially perpendicular to a flat spine 16a to form a partially closed loop. For convenience a power strip (not shown) can be mounted to the flat spine 16a. It should be noted that the ribs 20j and 20k are meant to be exemplary and other rib configurations discussed above could be used with a flat spine 16a.

Each cable way module can be attached to one or more additional cable way modules to form a modular cable way system. The cable way modules can be joined together using a variety of methods that are known for joining sections of EMT. For example, FIG. 16 is an exploded view showing a first spine 16b and a second spine 16c with a coupler 101 positioned between them. Each spine 16b and 16c have internal threads 103. The coupler 101 has external threads 105 adapted such that the outer diameter is slightly less than the inner diameter of the internal threads 103 such that the spines and the coupler can be screwed together. Alternatively, as shown in FIG. 17, external threads 107 can be formed along the outside of the spines 16b and 16c with corresponding internal threads 109 on a slightly larger diameter coupler 101. FIG. 18 shows two spines 16b and 16c joined by a coupler 101 that is secured using screws 111. These are but a few examples of methods of joining two spines together. A variety of methods used to join EMT or pipes could also be used including welding, soldering, or insertion fittings.

When installed in a facility, a section of cable way module is selected with a rib configuration appropriate to obtain the desired result. The spine of the cable way module is bent and shaped using standard tools for bending EMT. Once a desired shape is achieved, the spine can be inserted into the ceiling space and secured using a variety of methods used to secure EMT. Alternatively, the cable way module can be inserted into the ceiling space and then bent around obstacles before securing it. Cable can then be laid into the cable way module or strung through the cable way module depending on the rib configuration selected. The cable can be run through a series of connected modules. In other cases, the cable can span a small gap to transition from a cable way module having a cylindrical spine to a cable way module having a flat spine. The combination of the various spine and rib configurations allows for effective cable management.

The present invention is not limited to the preferred embodiments described here, but is to determined by reference to the claims and the rules of patent claim interpretation.

What is claimed is:

1. A cable way module comprising:
   (a) a bendable spine;
   (b) a plurality of ribs attached to said bendable spine; and
   (c) wherein a first end of each rib extends outward from the spine, bends downward, and curves under itself towards the spine to form a first U-shaped trough, and a second end of each rib extends outward from the spine in the opposite direction of the first end, bends downward, and curves under itself towards the spine to form a second U-shaped trough.

2. The cable way module of claim 1 wherein said cable way module is coupleable to at least one other said cable way module.

3. The cable way module of claim 1, wherein the spine is bendable during installation.

4. The cable way module of claim 1, wherein the spine is tubular.

5. The cable way module of claim 1, wherein the spine is flat.

6. A cable way module comprising:
   (a) a bendable spine;
   (b) a plurality of ribs attached to said bendable spine; and
   (c) wherein each rib forms an upward facing U-shaped trough above the spine and a closed loop below the spine.

7. The cable way module of claim 6, wherein the closed loop below the spine is substantially triangular.

8. The cable way module of claim 6 wherein said cable way module is coupleable to at least one other said cable way module.

9. The cable way module of claim 6, wherein the spine is bendable during installation.

10. The cable way module of claim 6, wherein the spine is tubular.

11. The cable way module of claim 6, wherein the spine is flat.

12. A method of installing a modular cable way system in a ceiling space above a dropped ceiling comprising:
   a) providing a cable way module having a bendable spine and at least one securing rib, a first end of each rib extends outward from the spine, bends downward, and curves under itself towards the spine to form a first U-shaped trough, and a second end of each rib extends outward from the spine in the opposite direction of the first end, bends downward, and curves under itself towards the spine to form a second U-shaped trough;
   b) bending the cable way module on site to avoid obstacles and make level changes;

c) inserting the cable way module into the ceiling space; and d) securing the cable way module into the ceiling space.

13. The method of claim 12, wherein the step of bending the cable way module further comprises the step of bending the cable way module using readily available to tools.

14. The method of claim 12, further comprising the step of connecting a first cable way module to a second cable way module.

15. The method of claim 12, wherein the step of inserting the cable way module is performed prior to the step of bending the cable way module.

16. A method of installing a modular cable way system in a ceiling space above a dropped ceiling comprising:

a) providing a cable way module having a bendable spine and at least one securing rib, each rib forms an upward facing U-shaped trough above the spine and a closed loop below the spine;

b) bending the cable way module on site to avoid obstacles and make level changes;

c) inserting the cable way module into the ceiling space; and d) securing the cable way module into the ceiling space.

17. The method of claim 16, wherein the step of bending the cable way module further comprises the step of bending the cable way module using readily available tools.

18. The method of claim 16, further comprising the step of connecting a first cable way module to a second cable way module.

19. The method of claim 16, wherein the step of inserting the cable way module is performed prior to the step of bending the cable way module.

\* \* \* \* \*